US012759469B2

(12) United States Patent
Gillette et al.

(10) Patent No.: US 12,759,469 B2
(45) Date of Patent: Oct. 13, 2026

(54) CARGO CONTAINMENT SYSTEM

(71) Applicant: GM Global Technology Operations LLC, Detroit, MI (US)

(72) Inventors: Thomas Gillette, Byron, MI (US); George W. Wade, III, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 392 days.

(21) Appl. No.: 18/469,060

(22) Filed: Sep. 18, 2023

(65) Prior Publication Data

US 2025/0091520 A1 Mar. 20, 2025

(51) Int. Cl.
*B60R 7/04* (2006.01)

(52) U.S. Cl.
CPC .................................... *B60R 7/043* (2013.01)

(58) Field of Classification Search
CPC ...................................................... B60R 7/043
See application file for complete search history.

(56) References Cited

U.S. PATENT DOCUMENTS

2015/0084360 A1* 3/2015 Mueller ............... B60N 2/3047 296/37.5
2015/0175080 A1 6/2015 Kmita et al.

FOREIGN PATENT DOCUMENTS

DE 102016117118 A1 3/2017

* cited by examiner

*Primary Examiner* — Dany E Akakpo
(74) *Attorney, Agent, or Firm* — Honigman LLP; Matthew H. Szalach

(57) ABSTRACT

A cargo containment system for a vehicle includes a main panel attached to a floor of the vehicle and rotatable relative to the floor between a stowed position substantially parallel to the floor and a use position substantially perpendicular to the floor and a first side panel rotatably attached to the main panel and movable with the main panel between the stowed position and the use position, the first side panel cooperating with the main panel to define a cargo storage area in the use position.

20 Claims, 6 Drawing Sheets

CARGO CONTAINMENT SYSTEM

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against present disclosure.

The present disclosure relates generally to a cargo containment system and, more particularly, to a cargo containment system moveable between a stowed position and a use position.

Conventional vehicles employ various structures and devices to secure cargo during transport. For example, sport utility vehicles (SUV) typically include a cargo net that spans a cargo area of the SUV in an effort to restrict movement of items during transport. Such netting is useful in containing groceries and other objects that would otherwise be unsecured and subject to braking and acceleration forces during movement of the vehicle. When these items are left unsecured, the forces associated with braking and accelerating may cause the items to move within the cargo area and cause damage to the items and/or the vehicle. Use of netting allows for slight movement of transported objects but prevents the objects from freely moving within the cargo area.

Securing cargo may also be achieved within a passenger compartment by providing the passenger compartment with fixed structures such as in-floor bins or under-seat containers. In-floor bins typically deploy from a floor pan of the vehicle and utilize space that is otherwise unused. Access to the bins is provided by hinged doors in the floor pan and hide transported items from view. Under-seat containers likewise utilize otherwise unused space in a vehicle by providing structure to locate and secure objects during transport. Such under-seat containers often provide a cavity or a box-like structure that secures and restricts movement of items during use.

While cargo netting adequately secures items during use, such netting often inhibits loading and unloading of larger items into the cargo area of an SUV. Under such circumstances, the netting must often be removed and remotely stored to provide unfettered access to and from the cargo area of the SUV. In the case of in-floor and under-seat storage systems, the structure providing the bins and the under-seat containers are permanent features that are not removable. As such, while these structures adequately store and restrict movement of items during use of the vehicle, such structures—in the case of under-seat storage systems—inhibit loading and unloading of larger cargo.

For example, when fixed, under-seat storage containers are employed under second-row seats of a truck, the containers restrict entry and removal of larger items when the second-row seats are in a stowed position. Specifically, when seat bottoms of the second-row seats are folded up against a seatback of the second-row seats to permit entry of larger cargo, the under-seat storage containers are often in the way and, thus, restrict the size of cargo that can be transported. Further, even if such containers are removable, removing the containers can be cumbersome—requiring use of one or more tools and/or remotely storing the containers when removed from the vehicle.

SUMMARY

In one configuration, a cargo containment system for a vehicle is provided and includes a main panel attached to a floor of the vehicle and rotatable relative to the floor between a stowed position substantially parallel to the floor and a use position substantially perpendicular to the floor and a first side panel rotatably attached to the main panel and movable with the main panel between the stowed position and the use position, the first side panel cooperating with the main panel to define a cargo storage area in the use position.

The cargo containment system may include one or more of the following optional features. For example, a second side panel may be rotatably attached to the main panel and may be movable with the main panel between the stowed position and the use position, the second side panel cooperating with the main panel and the first side panel to define the cargo storage area in the use position. The first side panel may be rotatably attached to a first edge of the main panel and the second side panel may be rotatably attached to a second edge of the main panel, the second edge being located on an opposite end of the main panel than the first edge. Additionally or alternatively, the first side panel and the second side panel may be substantially parallel to one another and to the main panel when the main panel is in the stowed position and/or the first side panel and the second side panel may be substantially parallel to one another and substantially perpendicular to the main panel when the main panel is in the use position. The first side panel, the second side panel, and the main panel may cooperate to form a substantially U-shape when the main panel is in the use position.

In one configuration, the first side panel may be substantially parallel to the main panel when the main panel is in the stowed position. Additionally or alternatively, the first side panel may be substantially perpendicular to the main panel when the main panel is in the use position.

In another configuration, a cargo containment system for a vehicle is provided and includes a main panel attached to a floor of the vehicle and rotatable relative to the floor about at least one pin between a stowed position substantially parallel to the floor and a use position substantially perpendicular to the floor, a pin of the at least one pin including one of a projection and a groove. The cargo containment system further includes a retainer attached to the floor and defining a channel rotatably receiving a pin of the at least one pin and including the other of the projection and the groove, the groove receiving the projection when the main panel is in the use position to maintain the main panel in the use position.

The cargo containment system may include one or more of the following optional features. For example, a first side panel may be rotatably attached to the main panel and may be movable with the main panel between the stowed position and the use position, the first side panel cooperating with the main panel to define a cargo storage area in the use position. The first side panel may be substantially parallel to the main panel when the main panel is in the stowed position and/or the first side panel may be substantially perpendicular to the main panel when the main panel is in the use position.

In one configuration, a second side panel may be rotatably attached to the main panel and may be movable with the main panel between the stowed position and the use position, the second side panel cooperating with the main panel and the first side panel to define the cargo storage area in the use position. The first side panel and the second side panel may be substantially parallel to one another and to the main panel when the main panel is in the stowed position and/or the first side panel and the second side panel may be substantially parallel to one another and substantially perpendicular to the main panel when the main panel is in the use position. The first side panel, the side second panel, and the main panel may cooperate to form a substantially U-shape when the main panel is in the use position.

In another configuration, a cargo containment system for a vehicle is provided and includes a main panel attached to a floor of the vehicle and rotatable relative to the floor between a stowed position substantially parallel to the floor and a use position substantially perpendicular to the floor, a first side panel rotatably attached to the main panel and movable with the main panel between the stowed position and the use position, and a second side panel rotatably attached to the main panel and movable with the main panel between the stowed position and the use position, the first side panel and the second side panel substantially parallel to the main panel in the stowed position and substantially perpendicular to the main panel in the use position.

The cargo containment system may include one or more of the following optional features. For example, the first side panel, the second side panel, and the main panel may cooperate to define a cargo storage area in the use position. Additionally or alternatively, the first side panel, the side second panel, and the main panel may cooperate to form a substantially U-shape when the main panel is in the use position.

A vehicle may incorporate the cargo containment system.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1:
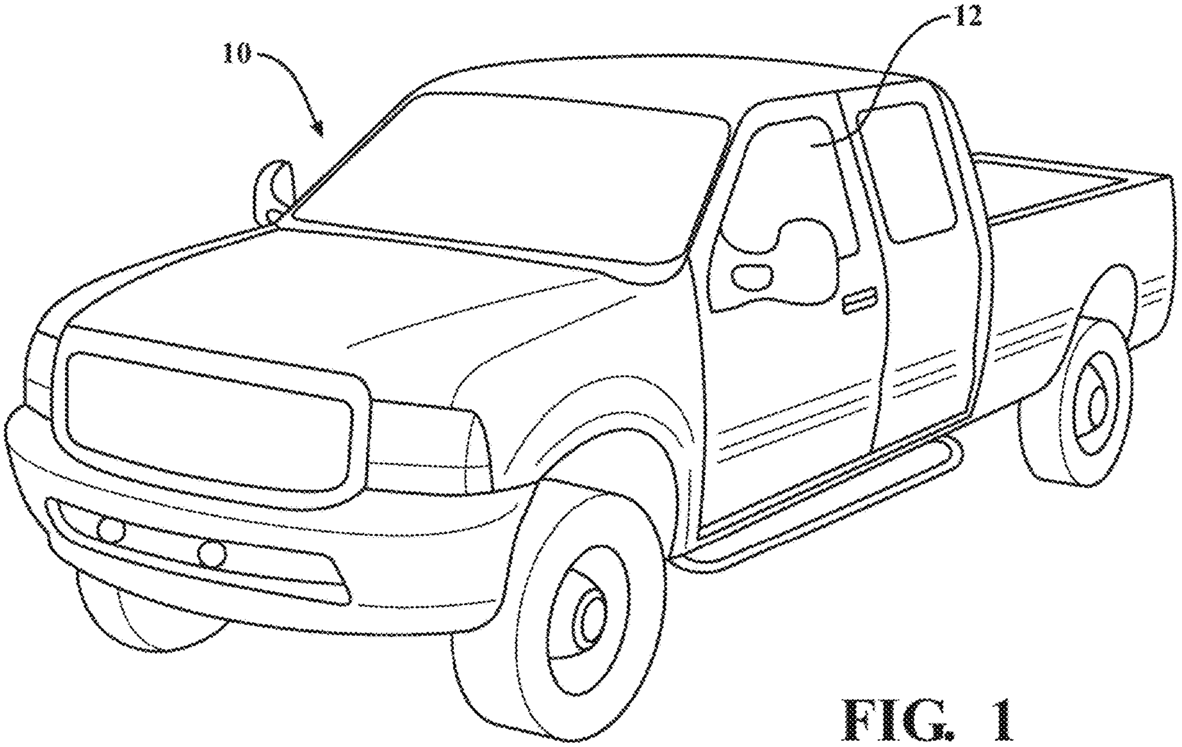
FIG. 1 is a perspective view of a vehicle in accordance with the principles of the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICS (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Figure 2:
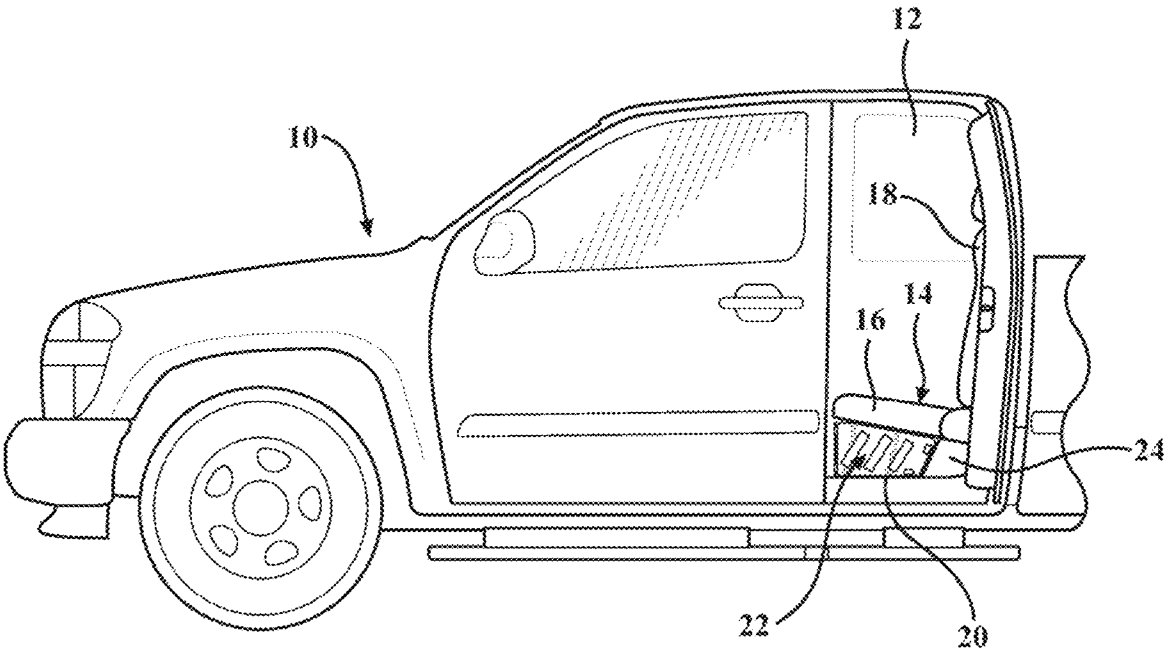
FIG. 2 is a partial side view of the vehicle of FIG. 1 with a rear door open to show a second-row seat in a use position and an under-seat storage system in accordance with the principles of the present disclosure in a use position.
Figure 3:
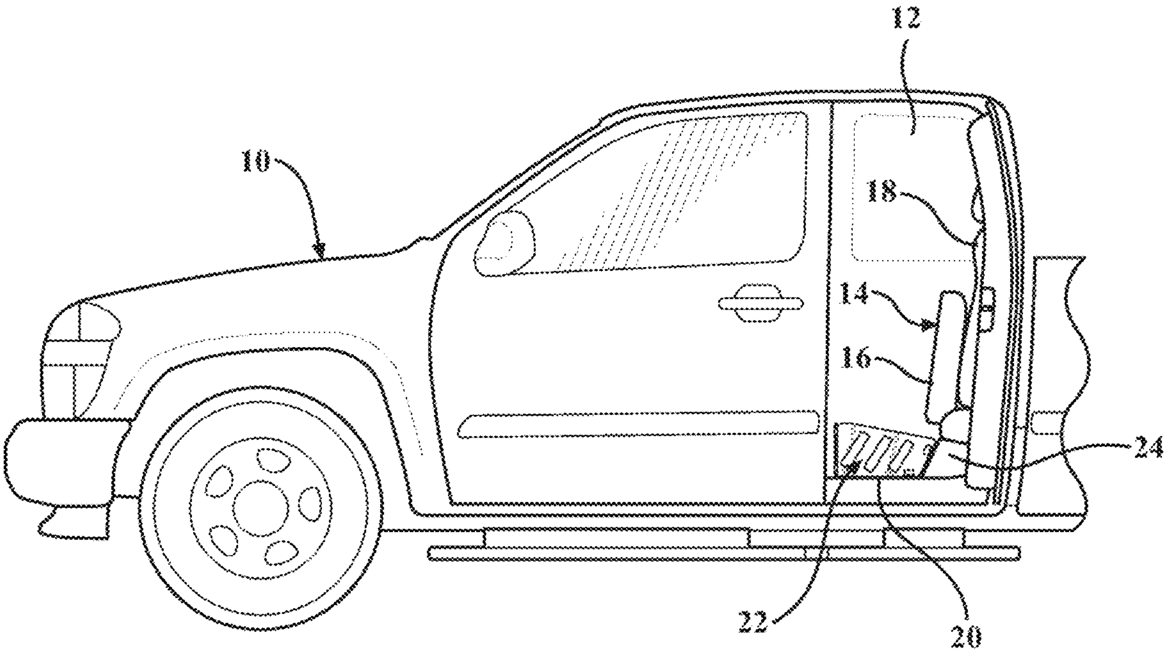
FIG. 3 is a partial side view of the vehicle of FIG. 1 with a rear door open to show a second-row seat in a stowed position and an under-seat storage system in accordance with the principles of the present disclosure in a use position.

With reference to FIGS. 1-3, a vehicle 10 is provided and includes a cabin 12 and a plurality of seats 14. Each seat 14 includes a seat bottom 16 pivotably connected to a seatback 18 with the seat bottom 16 movable relative to the seatback 18 between a use position (FIG. 2) and a stowed position (FIG. 3). When the seat bottom 16 is in the stowed position, the seat bottom 16 is disposed substantially parallel to the seatback 18 and exposes an area of a vehicle floor 20 located under the seat bottom 16 when the seat bottom 16 is in the use position.

Figure 11:
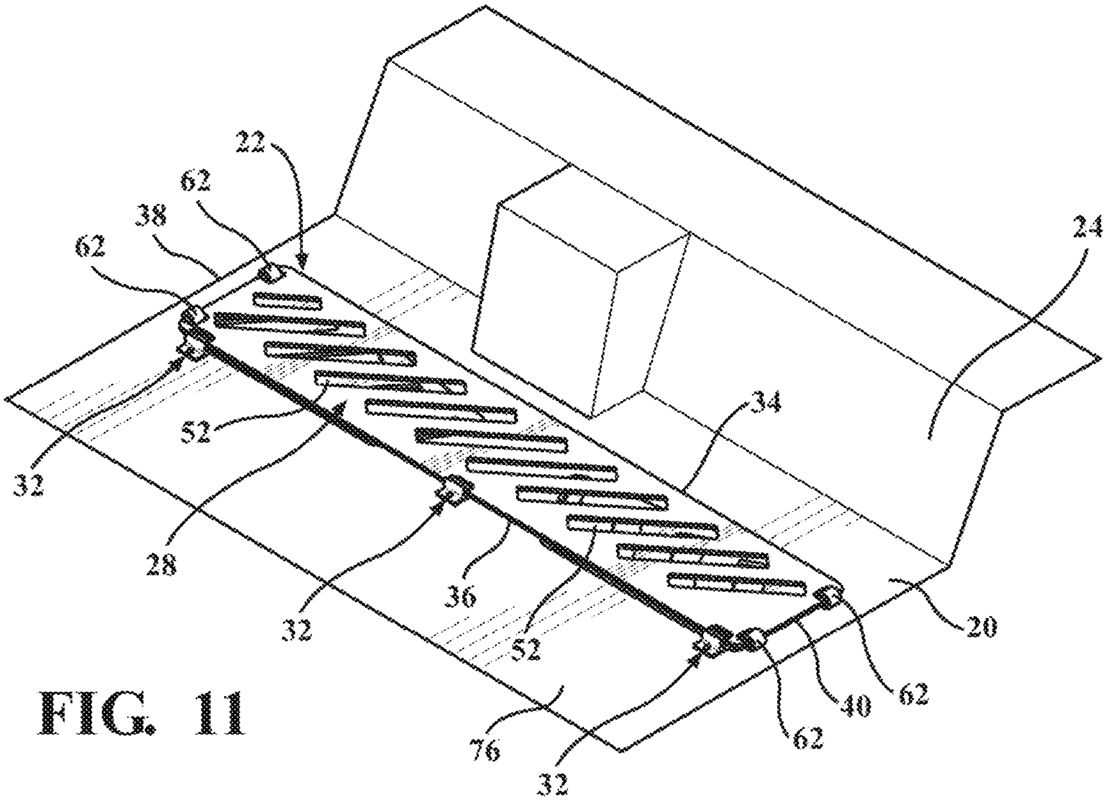
FIG. 11 is partial perspective view of a floor pan of the vehicle of FIG. 1 showing an under-seat storage system in accordance with the principles of the present disclosure in a stowed position.

A cargo storage system 22 is disposed on the vehicle floor 20 below the seat bottom 16 and may be selectively used to store cargo (none shown) during use of the vehicle 10. Namely, the cargo storage system 22 is movable between a stowed position (FIG. 11) and various use positions (FIGS. 12 and 13) and cooperates with the vehicle floor 20 and surrounding vehicle structure 24 to define a cargo area 26 (FIG. 13) that restricts movement of cargo disposed therein during use of the vehicle 10.

With reference to FIGS. 4-6, 9, and 10, the cargo storage system 22 is shown as including a main panel 28, side panels 30, and a series of retainers 32. The main panel 28 may be formed from a rigid material such as plastic and/or metal and includes a first edge 34, a second edge 36 disposed on an opposite side of the main panel 28 than the first edge 34, a third edge 38 extending between and connecting the first edge 34 and the second edge 36, and a fourth edge 40 extending between and connecting the first edge 34 and the second edge 36 and being disposed on an opposite side of the main panel 28 than the third edge 38. As shown, the main panel 28 includes a rectangular shape and, as such, the first edge 34 is substantially parallel to the second edge 36 and the third edge 38 is substantially parallel to the fourth edge 40. Further, the main panel 28 is elongate and extends along a longitudinal axis $L_{MP}$.

The first edge 34 extends along a length of the main panel 28 and is substantially straight and uniform. The second edge 36, the third edge 38, and the fourth edge 40 are likewise substantially straight but are not uniform. Namely, each of the second edge 36, the third edge 38, and the fourth edge 40 includes at least one recess 42 having pin 44 extending across a width of the recess 42 and forming a portion of each edge 36, 38, 40. Accordingly, each of the second edge 36, the third edge 38, and the fourth edge 40 is interrupted by one or more recesses 42 and associated pins 44. In the configuration shown in FIG. 4, the second edge 36 includes three (3) recesses 42 and associated pins 44 while the third edge 38 and the fourth edge 40 each includes two (2) recesses 42 and associated pins 44.

Figure 4:
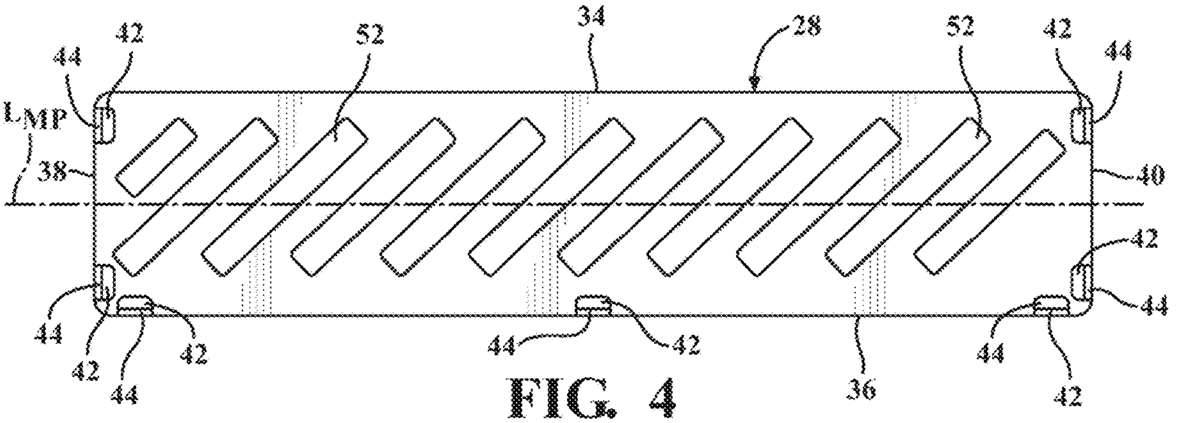
FIG. 4 is a front perspective view of a main panel of the under-seat storage system of FIG. 2.
Figure 9:
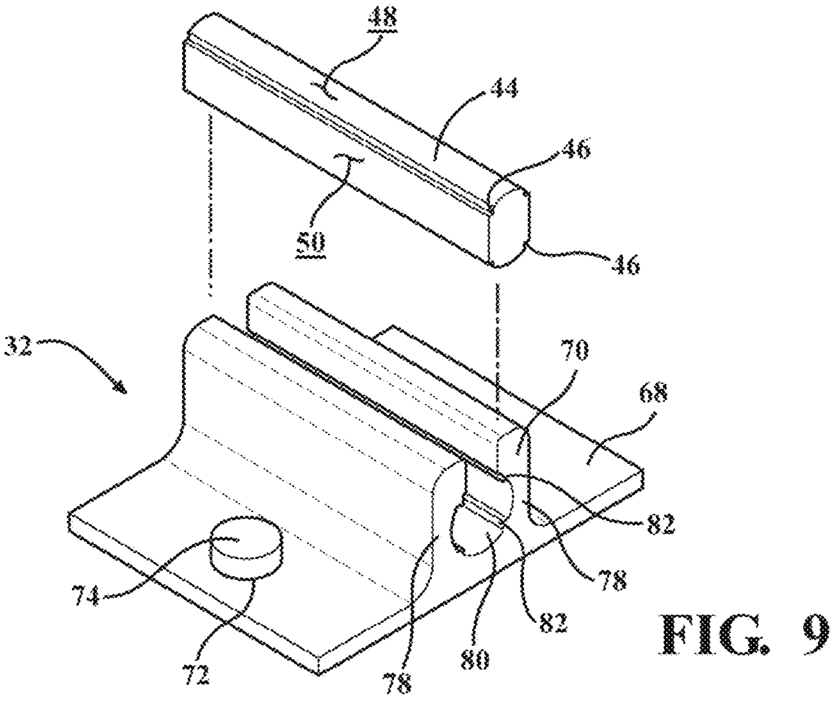
FIG. 9 is a perspective view of a retainer for use in securing the under-seat storage system of FIG. 2 within the vehicle of FIG. 1.
Figure 10:
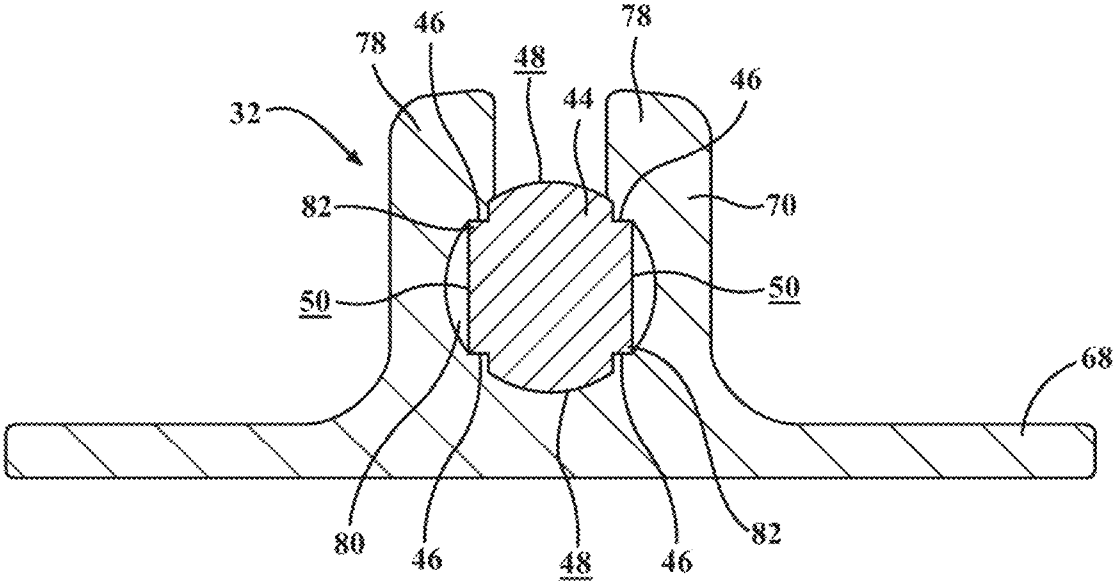
FIG. 10 is a cross-sectional view of the retainer of FIG. 9 showing a rod of the under-seat storage system of FIG. 2 disposed within a channel of the retainer.

The recesses 42 may include a D-shape and may have a respective pin 44 extending along an opening of the D-shape. As such, the pin 44 of each recess 42 may be aligned with the respective second edge 36, third edge 38, and fourth edge 40 to provide the edges 36, 38, 40 with a substantially straight profile, as shown in FIG. 4. The pins 44 may be integrally formed with the main panel 28 during an injection-molding process or, if the main panel 28 is formed form metal, during a stamping process. Regardless of how the main panel 28 is formed and from what material, each pin 44 may have a truncated, circular cross-section (FIG. 10) and may include a series of elongate grooves 46 extending between and separating opposing arcuate surfaces 48 and flat surfaces 50, as shown in FIGS. 9 and 10. As will be described below, the elongate grooves 46 cooperate with the retainer 32 to hold the main panel 28 in the use position. While each pin 44 may include a truncated, circular cross-section and a series of elongate grooves 46 for ease and simplicity of manufacturing the main panel 28, the pins 44 associated with the third edge 38 and the fourth edge 40 could alternatively include a circular cross-sectional area without the grooves 46.

The main panel 28 may include a series of apertures 52 formed through a thickness of the main panel 28. The apertures 52 may be formed at an angle relative to the longitudinal axis $L_{MP}$ and may be substantially parallel to one another. The apertures 52 provide the main panel 28 with reduced weight, thereby reducing the costs associated with manufacturing the main panel 28 and, further, the ease with which the main panel 28 is moved between the stowed position and the use position.

Figure 5:
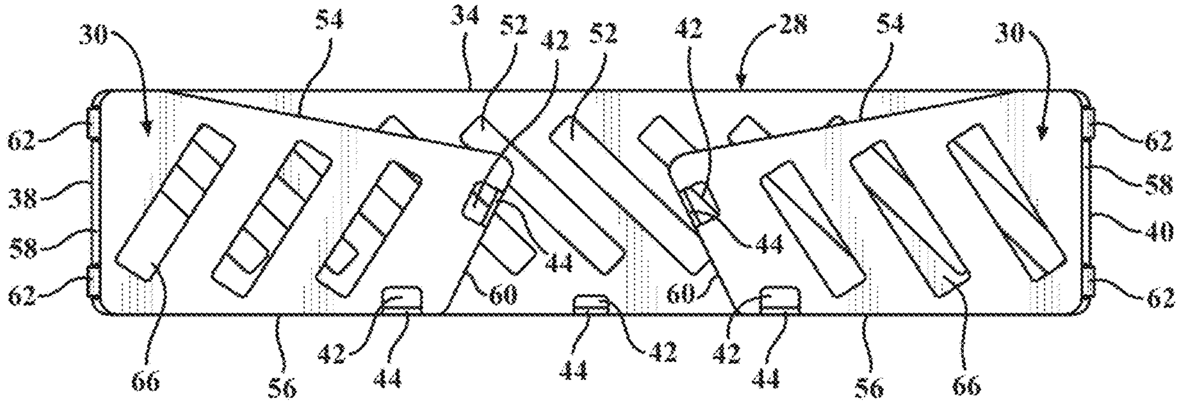
FIG. 5 is a rear perspective view of a main panel and two side panels of the under-seat storage system of FIG. 2.

With particular reference to FIG. 5, the side panels 30 each includes a first edge 54, a second edge 56 disposed on an opposite side of each side panel 30 than the first edge 54, a third edge 58, and a fourth edge 60 disposed on an opposite side of each side panel 30 than the third edge 58. As shown in FIG. 5, the first edge 54 of each side panel 30 slopes in a direction away from the first edge 34 of the main panel 28 at a junction of each side panel 30 and the main panel 28 in a direction toward the second edge 36 of the main panel 28. In one configuration, and as shown in FIG. 5, the slope of the first edge 54 of each side panel 30 is substantially constant such that the first edges 54 of each side wall 30 is straight. Further, when the side panels 30 are in the stowed position (FIG. 5), the first edges 54 of each side panel 30 slope in a direction toward one another with the fourth edges 40 opposing one another. Finally, the sloped nature of the first surface 54 of each side panel 30 provides each side panel 30 with a tapered thickness that decreases in a direction away from the respective third edges 58 of each side panel 30.

The second edges 56 of each side panel 30 are substantially straight and are substantially parallel to the second edge 36 of the main panel 28 when the side panels 30 are in the stowed position (FIG. 5). As shown, the second edges 56 each includes one (1) recess 42 and associated pin 44. The recesses 42 and pins 44 are identical to the recesses 42 and pins 44 described above with respect to the main panel 28.

Figure 6:
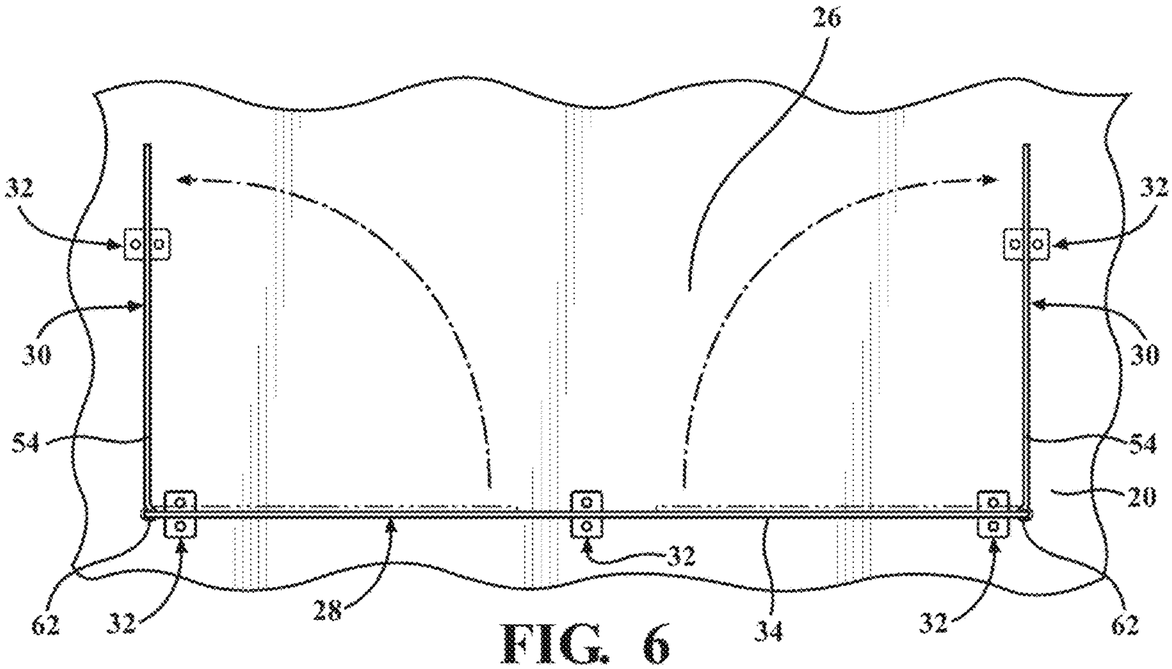
FIG. 6 is a top view of the under-seat storage system of FIG. 2 in the use position.

The third edge 58 extends between and connects the first edge 54 and the second edge 56 of each side panel 30. Further, each third edge 58 extends along and is substantially parallel to a respective one of the third edge 38 and the fourth edge 40 of the main panel 28. The third edges 58 each side panel 30 includes two (2) hooks 62 defining a substantially circular opening 64. The openings 64 respectively receive a pin 44 of the third edge 38 and the fourth edge 40 of the main panel 28 to rotatably attach the side panels 30 to the main panel 28. In one configuration, the main panel 28 and the side panels 30 are formed from plastic with the pins 44 and the hooks 62 being integrally formed therewith and similarly formed from plastic. Accordingly, the hooks 62 are formed from a resilient and pliable material and receive the respective pins 44 in a snap-fit arrangement. The snap-fit arrangement allows the hooks 62 to flex when the pins 44 are initially inserted into the hooks 62 and snap onto the pins 44 once the pins 44 are sufficiently inserted into the circular openings 64 defined by the hooks 62. The connection between the pins 44 and the hooks 62 maintains engagement between the side panels 30 and the main panel 28 while concurrently allowing the side panels 30 to rotate relative to the main panel 28 between the stowed position (FIG. 5) and the use position (FIG. 6).

The fourth edges 60 of each side panel 30 oppose one another when the side panels 30 are in the stowed position. Each fourth edge 60 includes a back-angled surface that causes the first edge 54 of each side panel 30 to be longer than each second edge 56 of each side panel 30, as shown in FIG. 5. Accordingly, when the side panels 30 are in the stowed position, the fourth edges 40 of each side panel 30 oppose one another and are closest to one another at a junction of each fourth edge 40 and each first edge 54 and are furthest from one another at a junction of each fourth edge 40 and each second edge 36. The fourth edges 40 are substantially straight and each includes one (one) recess 42 and pin 44.

As mentioned above, each recess 42 and pin 44 is identical to those described above with respect to the main panel 28. Finally, as with the main panel 28, each of the pins 44 may include a truncated, circular cross-section with longitudinal grooves 46 or, alternatively, the pins 44 associated with the second edges 36 of each side panel 30 may include a truncated, circular cross-section with longitudinal grooves 46 and the pins 44 associated with the third edges 58 and the fourth edges 60 may include circular cross-sections.

The side panels 30 may additionally include a series of apertures 66 formed through a thickness of the side panels 30. The apertures 66 may be formed at the same or similar angle as the apertures 52 of the main panel 28. The apertures 66 provide the side panels 30 with reduced weight, thereby reducing the costs associated with manufacturing the side panels 30 and, further, the ease with which the side panels 30 are moved between the stowed position and the use position.

With particular reference to FIGS. 9 and 10, the retainer 32 is shown as including a main body 68 and a projection 72 extending from and integrally formed with the main body 68. The retainer 32 may be formed from a rigid material such as plastic or metal and is secured to the vehicle floor 20. Specifically, the main body 68 includes at least one aperture 72 formed through a thickness of the main body 68. The aperture 72 may receive a fastener 74 that attaches the main body 68 and, thus, the retainer 32 to the vehicle 20. The fastener 74 may include a series of threads (not shown) that engage carpet fibers of the vehicle floor 20 or a structure of the vehicle floor 20 such as a floor pan 76 (FIGS. 11-13) to fix a position of the retainer 32 relative to the vehicle floor 20.

The projection 70 extends from the main body 68 in a direction away from the vehicle floor 20 and includes a pair of opposing walls 78 cooperating to define a channel 80 disposed between the walls 78. The channel 80 includes a substantially circular cross-section having a radius that is equal to a radius of the pins 44 at the arcuate surfaces 48. The circular cross-section of the channel 80 is interrupted by four (4) projections 82 having the same shape and size as the elongate grooves 46 of the pins 44. Accordingly, when the pins 44 are received within the channel 80, and the main panel 28 is rotated into the use position, the projections 82 are matingly received by the respective grooves 46 to maintain the main panel 28 in the use position, as will be described in greater detail below.

Figure 7:
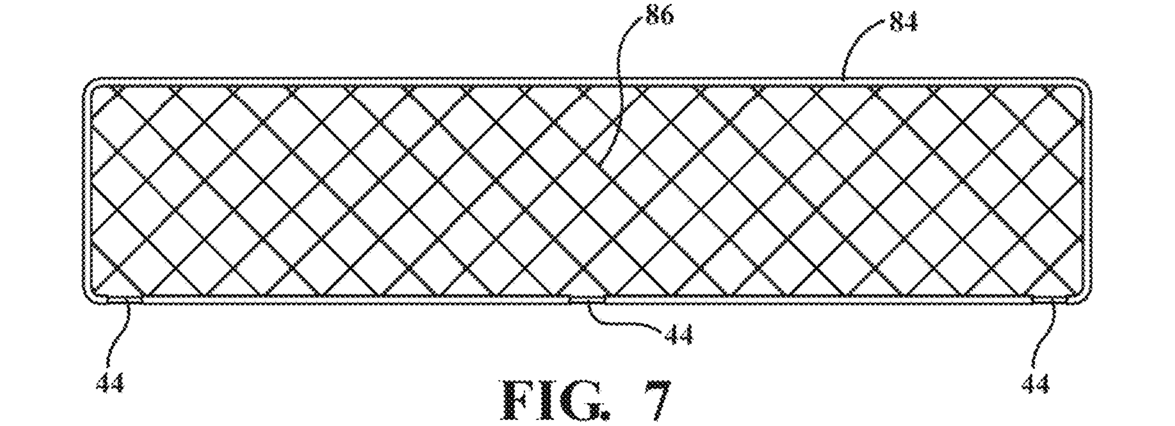
FIG. 7 is a front perspective view of a main panel of the under-seat storage system of FIG. 2 including a frame and netting.
Figure 8:
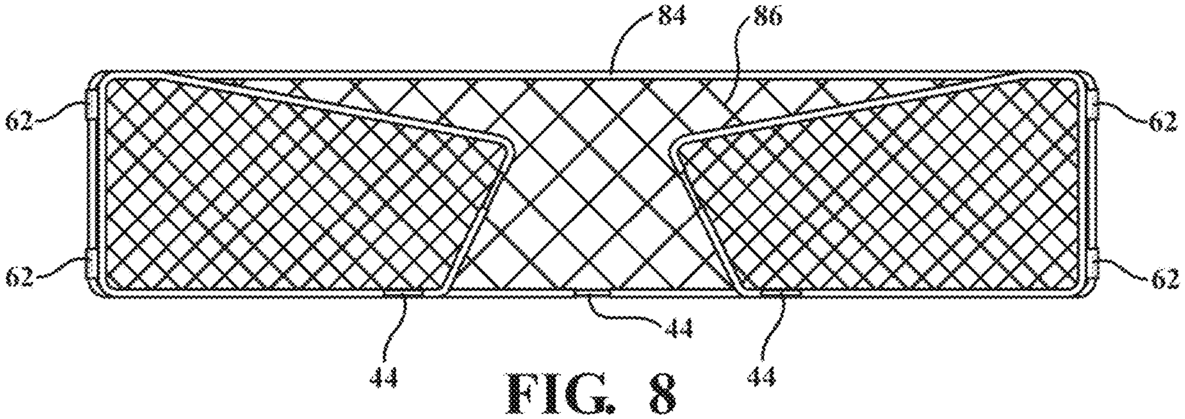
FIG. 8 is a rear perspective view of a main panel and two side panels of the under-seat storage system of FIG. 2 each including a frame and netting.

While the main panel 28 and the side panels 30 are described and shown as being formed from plastic and/or metal, the main panel 28 and side panels 30 could alternatively include a frame 84 and netting 86 that have the same size and shape as the main panel 28 and the side panels 30, as shown in FIGS. 7 and 8. Specifically, the frame 84 may be formed from a rigid material such as, for example, plastic or metal and may include pins 44 integrally formed therewith for receipt by the retainers 32 in a similar fashion as the main panel 28 and the side panels 30. Further, the frame 84 may include hooks 62 in a similar fashion as the side panels 30. While the cargo storage system 22 may include a frame 84 and netting 86 in place of the main panel 28 and the side panels 30, the cargo storage system 22 will be described and shown hereinafter and in the drawings as including the main panel 28 and the side panels 30.

The main panel 28 is rotatably attached to the vehicle 10 at the retainers 32 by inserting the pins 44 of the second side 36 into the channels 80 of the retainers 32. Specifically, when a pin 44 initially engages a respective retainer 32 at an opening of the channel 80, the walls 78 of the retainer 32 flex and move away from one another to accommodate the pin 44. Once the pin 44 is sufficiently received within the channel 80, the walls 78 return to a relaxed state (FIG. 10) to retain the pin 44 within the channel 80. At this point, the main panel 28 is rotatably attached to the vehicle floor 20. Further, the side panels 30 are likewise attached to the vehicle floor 20 via the main panel 28, as the side panels 30 are rotatably attached to the main panel 28 via the pins 44 and hooks 62, as described above. Accordingly, when the side panels 30 are in the stowed position (FIG. 5), the side panels 30 move with the main panel 28 relative to the vehicle floor 20 and are only attached to the vehicle floor 20 due to engagement between the main panel 28 and the vehicle floor 20.

In operation, the main panel 28 may be in the stowed position (FIG. 11) such that the main panel 28 is substantially parallel to the floor pan 76. It should be noted that while the main panel 28 is shown relative to the floor pan 76, a layer of padding and carpet (neither shown) may extend between the floor pan 76 and the main panel 28. As such, when the main panel 28 is in the stowed position, the main panel 28 may rest on the carpet of the vehicle floor 20.

Figure 12:
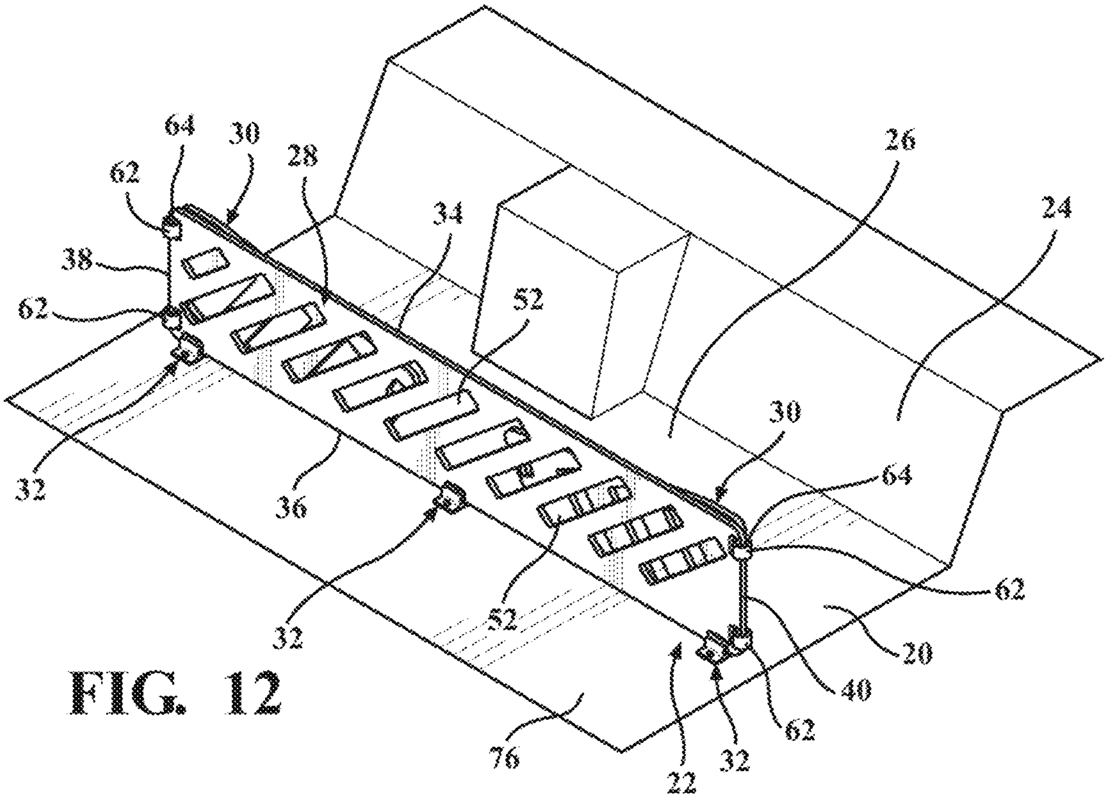
FIG. 12 is a partial perspective view of a floor pan of the vehicle of FIG. 1 showing an under-seat storage system in accordance with the principles of the present disclosure in a use position with side panels of the under-seat storage system in a stowed position.

The main panel 28 may be pivoted relative to the vehicle floor 20 from the stowed position (FIG. 11) to the use position (FIG. 12) by applying a force on the main panel 28 to rotate the pins 44 relative to and within the respective retainers 32. Once the main panel 28 is sufficiently rotated relative to the vehicle floor 20, the projections 70 of the retainers 32 engage respective grooves 46 of the pins 44 to hold the main panel 28 in the use position. As shown in FIG. 12, when the main panel 28 is in the use position, the main panel 28 is substantially perpendicular to the vehicle floor 20. At this point, the side panels 30 are in the stowed position and are substantially parallel to the main panel 28.

Figure 13:
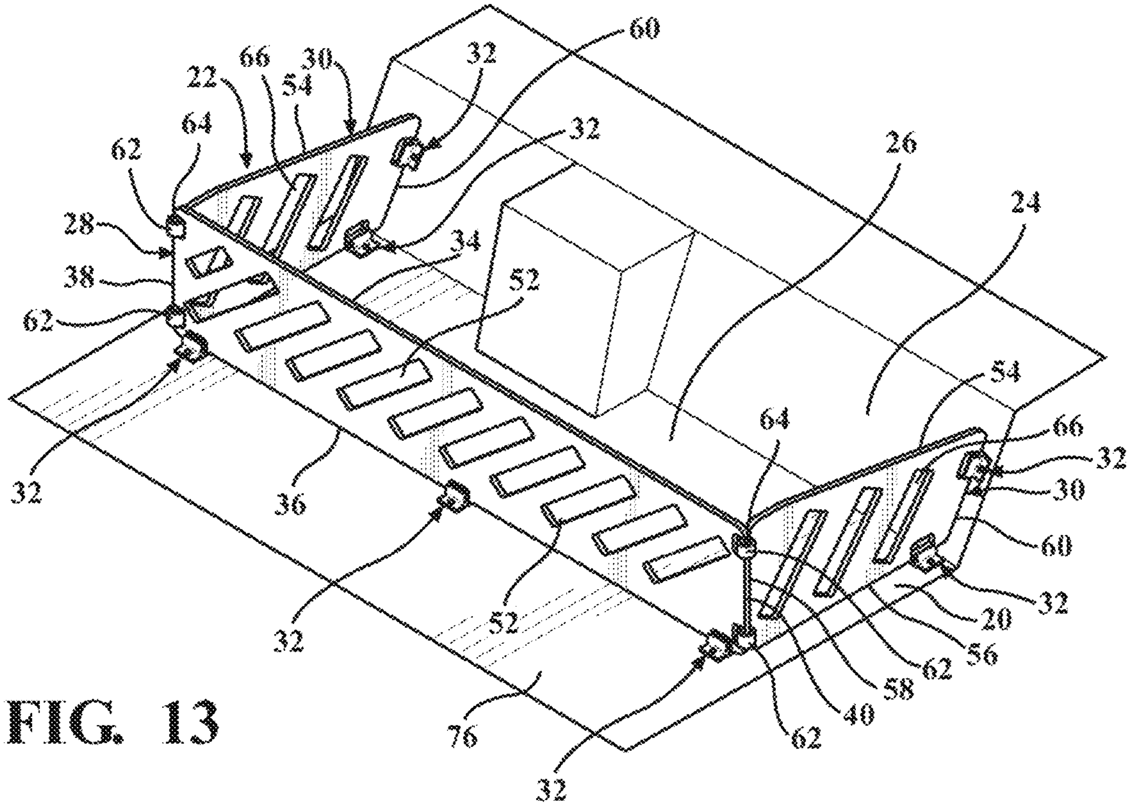
FIG. 13 is a partial perspective view of a floor pan of the vehicle of FIG. 1 showing an under-seat storage system in accordance with the principles of the present disclosure in a use position with side panels of the under-seat storage system in a use position.

The side panels 30 may be rotated relative to the main panel 28 about the hooks 62 and associated pins 44 until the side panels 30 are substantially perpendicular to the main panel 28. In this position, the side panels 30 cooperate with the main panel 28 to form a substantially U-shape, as shown in FIG. 6. Once rotated, the side panels 30 may engage retainers 32 attached to the vehicle floor 20 in an identical fashion as described above with respect to the main panel 28. Additionally, the pins 44 associated with the fourth edges 60 may engage retainers 32 attached to surrounding vehicle structure 24, as shown in FIG. 13. At this point, a cargo area 26 is defined by the main panel 28, the side panels 30, and the vehicle structure 24. The cargo area 26 can receive and contain cargo, which will be restricted from moving by the main panel 28, the side panels 30, and the vehicle structure 24 when subjected to forces associated with the vehicle 10 accelerating or braking.

The cargo storage system 22 may be returned to the stowed position by disengaging the pins 44 associated with the side panels 30 from the retainers 32 of the vehicle floor 20 and the surrounding vehicle structure 24. Once disengaged, the side panels 30 may be rotated relative to the main panel 28 until the side panels 30 extend along and are substantially parallel to the main panel 28 (FIG. 5). At this point, the main panel 28 can be rotated about the pins 44 of the second edge 36 relative to the vehicle floor 20 until the main panel 28 and side panels 30 are substantially parallel to and rest upon the vehicle floor 20. Positioning the main panel 28 and the side panels 30 in the stowed position allows for larger cargo to be inserted into the cabin 12 at a location of the cargo storage system 22.

As described, the cargo storage system 22 selectively creates a cargo area 26 when in the use position to retain items at a location of the vehicle floor 20 under a seat 14 whether the seat 14 is in a use position or a stowed position. The cargo storage system 22 may be folded and rotated into a stowed position to permit larger cargo to be inserted into the cabin 12 when the seat 14 is in the stowed position without having to remove the cargo storage system 22.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A cargo containment system for a vehicle, the cargo containment system comprising:

- a main panel attached to a floor of the vehicle and rotatable relative to the floor about a pin between a stowed position substantially parallel to the floor and a use position substantially perpendicular to the floor, the pin including a groove;
- a retainer attached to the floor, defining a channel configured to receive the pin, and including a projection, the projection being received by the groove of the pin when the main panel is in the use position to maintain the main panel in the use position; and
- a first side panel rotatably attached to the main panel and movable with the main panel between the stowed position and the use position, the first side panel cooperating with the main panel to define a cargo storage area in the use position.

2. The cargo containment system of claim 1, further comprising a second side panel rotatably attached to the main panel and movable with the main panel between the stowed position and the use position, the second side panel cooperating with the main panel and the first side panel to define the cargo storage area in the use position.

3. The cargo containment system of claim 2, wherein the first side panel is rotatably attached to a first edge of the main panel and the second side panel is rotatably attached to a second edge of the main panel, the second edge being located on an opposite end of the main panel than the first edge.

4. The cargo containment system of claim 2, wherein the first side panel and the second side panel are substantially parallel to one another and to the main panel when the main panel is in the stowed position.

5. The cargo containment system of claim 2, wherein the first side panel and the second side panel are substantially parallel to one another and substantially perpendicular to the main panel when the main panel is in the use position.

6. The cargo containment system of claim 2, wherein the first side panel, the second side panel, and the main panel cooperate to form a substantially U-shape when the main panel is in the use position.

7. The cargo containment system of claim 1, wherein the first side panel is substantially parallel to the main panel when the main panel is in the stowed position.

8. The cargo containment system of claim 1, wherein the first side panel is substantially perpendicular to the main panel when the main panel is in the use position.

9. A cargo containment system for a vehicle, the cargo containment system comprising:

- a main panel attached to a floor of the vehicle and rotatable relative to the floor about at least one pin between a stowed position substantially parallel to the floor and a use position substantially perpendicular to the floor, a pin of the at least one pin including a groove; and
- a retainer attached to the floor and defining a channel rotatably receiving the pin of the at least one pin and including a projection, the groove of the pin of the at least one pin configured to receive the projection when the main panel is in the use position to maintain the main panel in the use position.

10. The cargo containment system of claim 9, further comprising a first side panel rotatably attached to the main panel and movable with the main panel between the stowed position and the use position, the first side panel cooperating with the main panel to define a cargo storage area in the use position.

11. The cargo containment system of claim 10, wherein the first side panel is substantially parallel to the main panel when the main panel is in the stowed position.

12. The cargo containment system of claim 10, wherein the first side panel is substantially perpendicular to the main panel when the main panel is in the use position.

13. The cargo containment system of claim 10, further comprising a second side panel rotatably attached to the main panel and movable with the main panel between the stowed position and the use position, the second side panel cooperating with the main panel and the first side panel to define the cargo storage area in the use position.

14. The cargo containment system of claim 13, wherein the first side panel and the second side panel are substantially parallel to one another and to the main panel when the main panel is in the stowed position.

15. The cargo containment system of claim 13, wherein the first side panel and the second side panel are substantially parallel to one another and substantially perpendicular to the main panel when the main panel is in the use position.

16. The cargo containment system of claim 13, wherein the first side panel, the second side panel, and the main panel cooperate to form a substantially U-shape when the main panel is in the use position.

17. A cargo containment system for a vehicle, the cargo containment system comprising:

a main panel attached to a floor of the vehicle and rotatable relative to the floor about a pin between a stowed position substantially parallel to the floor and a use position substantially perpendicular to the floor, the pin including a groove;

a retainer attached to the floor, defining a channel configured to receive the pin, and including a projection, the groove of the pin configured to receive the projection when the main panel is in the use position to maintain the main panel in the use position;

a first side panel rotatably attached to the main panel and movable with the main panel between the stowed position and the use position; and a second side panel rotatably attached to the main panel and movable with the main panel between the stowed position and the use position, the first side panel and the second side panel substantially parallel to the main panel in the stowed position and substantially perpendicular to the main panel in the use position.

18. The cargo containment system of claim 17, wherein the first side panel, the second side panel, and the main panel cooperate to define a cargo storage area in the use position.

19. The cargo containment system of claim 17, wherein the first side panel, the second side panel, and the main panel cooperate to form a substantially U-shape when the main panel is in the use position.

20. A vehicle incorporating the cargo containment system of claim 17.

* * * * *